United States Patent
Avendano et al.

(10) Patent No.: US 8,259,926 B1
(45) Date of Patent: Sep. 4, 2012

(54) SYSTEM AND METHOD FOR 2-CHANNEL AND 3-CHANNEL ACOUSTIC ECHO CANCELLATION

(75) Inventors: Carlos Avendano, Mountain View, CA (US); Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1283 days.

(21) Appl. No.: 12/004,899

(22) Filed: Dec. 21, 2007

Related U.S. Application Data (60) Provisional application No. 60/903,066, filed on Feb. 23, 2007, provisional application No. 60/962,198, filed on Jul. 26, 2007.

(51) Int. Cl.
*H04M 9/08* (2006.01)
(52) U.S. Cl. .............................. 379/406.02; 379/406.03
(58) Field of Classification Search ............. 379/406.02, 379/406.03
See application file for complete search history.

(56) References Cited

U.S. PATENT DOCUMENTS

| | | |
|---|---|---|
| 3,976,863 A | 8/1976 | Engel |
| 3,978,287 A | 8/1976 | Fletcher et al. |
| 4,137,510 A | 1/1979 | Iwahara |
| 4,433,604 A | 2/1984 | Ott |
| 4,516,259 A | 5/1985 | Yato et al. |
| 4,535,473 A | 8/1985 | Sakata |
| 4,536,844 A | 8/1985 | Lyon |
| 4,581,758 A | 4/1986 | Coker et al. |
| 4,628,529 A | 12/1986 | Borth et al. |
| 4,630,304 A | 12/1986 | Borth et al. |
| 4,649,505 A | 3/1987 | Zinser, Jr. et al. |
| 4,658,426 A | 4/1987 | Chabries et al. |
| 4,674,125 A | 6/1987 | Carlson et al. |
| 4,718,104 A | 1/1988 | Anderson |
| 4,811,404 A | 3/1989 | Vilmur et al. |
| 4,812,996 A | 3/1989 | Stubbs |
| 4,864,620 A | 9/1989 | Bialick |
| 4,920,508 A | 4/1990 | Yassaie et al. |
| 5,027,410 A | 6/1991 | Williamson et al. |
| 5,054,085 A | 10/1991 | Meisel et al. |
| 5,058,419 A | 10/1991 | Nordstrom et al. |

(Continued)

FOREIGN PATENT DOCUMENTS
JP 2005172865 7/1933

(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

(Continued)

*Primary Examiner* — Alexander Jamal
(74) *Attorney, Agent, or Firm* — Carr & Ferrell LLP (57) ABSTRACT

Systems and methods for providing acoustic echo cancellation are provided. Primary and secondary acoustic signals are received by a communication device. The acoustic signals may include loudspeaker leakage. A null coefficient is then adaptively determined for each subband of the secondary acoustic signal. The null coefficient is applied to the secondary acoustic signal to generate a coefficient-modified signal. The coefficient-modified signal is subtracted from the primary acoustic signal to generate a masked acoustic signal with reduced or no echo. The masked acoustic signal may be output.

20 Claims, 5 Drawing Sheets

U.S. PATENT DOCUMENTS

| | | |
|---|---|---|
| 5,099,738 A | 3/1992 | Hotz |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |
| 5,187,776 A | 2/1993 | Yanker |
| 5,208,864 A | 5/1993 | Kaneda |
| 5,210,366 A | 5/1993 | Sykes, Jr. |
| 5,224,170 A | 6/1993 | Waite, Jr. |
| 5,230,022 A | 7/1993 | Sakata |
| 5,319,736 A | 6/1994 | Hunt |
| 5,323,459 A | 6/1994 | Hirano |
| 5,341,432 A | 8/1994 | Suzuki et al. |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,471,195 A | 11/1995 | Rickman |
| 5,473,702 A | 12/1995 | Yoshida et al. |
| 5,473,759 A | 12/1995 | Slaney et al. |
| 5,479,564 A | 12/1995 | Vogten et al. |
| 5,502,663 A | 3/1996 | Lyon |
| 5,544,250 A | 8/1996 | Urbanski |
| 5,574,824 A | 11/1996 | Slyh et al. |
| 5,583,784 A | 12/1996 | Kapust et al. |
| 5,587,998 A * | 12/1996 | Velardo, Jr. et al. .......... 370/289 |
| 5,590,241 A | 12/1996 | Park et al. |
| 5,602,962 A | 2/1997 | Kellermann |
| 5,675,778 A | 10/1997 | Jones |
| 5,682,463 A | 10/1997 | Allen et al. |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,757,937 A | 5/1998 | Itoh et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,825,320 A | 10/1998 | Miyamori et al. |
| 5,839,101 A | 11/1998 | Vahatalo et al. |
| 5,920,840 A | 7/1999 | Satyamurti et al. |
| 5,933,495 A | 8/1999 | Oh |
| 5,943,429 A | 8/1999 | Handel |
| 5,956,674 A | 9/1999 | Smyth et al. |
| 5,974,380 A | 10/1999 | Smyth et al. |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,097,820 A | 8/2000 | Turner |
| 6,108,626 A | 8/2000 | Cellario et al. |
| 6,122,610 A | 9/2000 | Isabelle |
| 6,134,524 A | 10/2000 | Peters et al. |
| 6,137,349 A | 10/2000 | Menkhoff et al. |
| 6,140,809 A | 10/2000 | Doi |
| 6,173,255 B1 | 1/2001 | Wilson et al. |
| 6,180,273 B1 | 1/2001 | Okamoto |
| 6,216,103 B1 | 4/2001 | Wu et al. |
| 6,222,927 B1 | 4/2001 | Feng et al. |
| 6,223,090 B1 | 4/2001 | Brungart |
| 6,226,616 B1 | 5/2001 | You et al. |
| 6,263,307 B1 | 7/2001 | Arslan et al. |
| 6,266,633 B1 | 7/2001 | Higgins et al. |
| 6,317,501 B1 | 11/2001 | Matsuo |
| 6,339,758 B1 | 1/2002 | Kanazawa et al. |
| 6,355,869 B1 | 3/2002 | Mitton |
| 6,363,345 B1 | 3/2002 | Marash et al. |
| 6,381,570 B2 | 4/2002 | Li et al. |
| 6,430,295 B1 | 8/2002 | Handel et al. |
| 6,434,417 B1 | 8/2002 | Lovett |
| 6,449,586 B1 | 9/2002 | Hoshuyama |
| 6,469,732 B1 | 10/2002 | Chang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,529,606 B1 | 3/2003 | Jackson, Jr. II et al. |
| 6,549,630 B1 | 4/2003 | Bobisuthi |
| 6,584,203 B2 | 6/2003 | Elko et al. |
| 6,622,030 B1 | 9/2003 | Romesburg et al. |
| 6,717,991 B1 | 4/2004 | Nordholm et al. |
| 6,718,309 B1 | 4/2004 | Selly |
| 6,738,482 B1 | 5/2004 | Jaber |
| 6,760,450 B2 | 7/2004 | Matsuo |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,810,273 B1 | 10/2004 | Mattila et al. |
| 6,882,736 B2 | 4/2005 | Dickel et al. |
| 6,915,264 B2 | 7/2005 | Baumgarte |
| 6,917,688 B2 | 7/2005 | Yu et al. |
| 6,944,510 B1 | 9/2005 | Ballesty et al. |
| 6,978,159 B2 | 12/2005 | Feng et al. |
| 6,982,377 B2 | 1/2006 | Sakurai et al. |
| 6,999,582 B1 | 2/2006 | Popovic et al. |
| 7,016,507 B1 | 3/2006 | Brennan |
| 7,020,605 B2 | 3/2006 | Gao |
| 7,031,478 B2 | 4/2006 | Belt et al. |
| 7,054,452 B2 | 5/2006 | Ukita |
| 7,065,485 B1 | 6/2006 | Chong-White et al. |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,142,677 B2 | 11/2006 | Gonopolskiy et al. |
| 7,146,316 B2 | 12/2006 | Alves |
| 7,155,019 B2 | 12/2006 | Hou |
| 7,164,620 B2 * | 1/2007 | Hoshuyama .................. 367/129 |
| 7,171,008 B2 | 1/2007 | Elko |
| 7,171,246 B2 | 1/2007 | Mattila et al. |
| 7,174,022 B1 | 2/2007 | Zhang et al. |
| 7,206,418 B2 | 4/2007 | Yang et al. |
| 7,209,567 B1 | 4/2007 | Kozel et al. |
| 7,225,001 B1 | 5/2007 | Eriksson et al. |
| 7,242,762 B2 | 7/2007 | He et al. |
| 7,246,058 B2 | 7/2007 | Burnett |
| 7,254,242 B2 | 8/2007 | Ise et al. |
| 7,359,520 B2 | 4/2008 | Brennan et al. |
| 7,412,379 B2 | 8/2008 | Taori et al. |
| 7,433,907 B2 | 10/2008 | Nagai et al. |
| 7,555,434 B2 | 6/2009 | Nomura et al. |
| 7,617,099 B2 | 11/2009 | Yang et al. |
| 7,949,522 B2 | 5/2011 | Hetherington et al. |
| 8,098,812 B2 | 1/2012 | Fadili et al. |
| 2001/0016020 A1 | 8/2001 | Gustafsson et al. |
| 2001/0031053 A1 | 10/2001 | Feng et al. |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0147595 A1 | 10/2002 | Baumgarte |
| 2002/0184013 A1 | 12/2002 | Walker |
| 2003/0014248 A1 | 1/2003 | Vetter |
| 2003/0026437 A1 * | 2/2003 | Janse et al. .................... 381/71.4 |
| 2003/0033140 A1 | 2/2003 | Taori et al. |
| 2003/0039369 A1 | 2/2003 | Bullen |
| 2003/0040908 A1 | 2/2003 | Yang et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0101048 A1 | 5/2003 | Liu |
| 2003/0103632 A1 | 6/2003 | Goubran et al. |
| 2003/0128851 A1 | 7/2003 | Furuta |
| 2003/0138116 A1 | 7/2003 | Jones et al. |

| | | |
|---|---|---|
| 2003/0147538 A1 | 8/2003 | Elko |
| 2003/0169891 A1 | 9/2003 | Ryan et al. |
| 2003/0228023 A1 | 12/2003 | Burnett et al. |
| 2004/0013276 A1 | 1/2004 | Ellis et al. |
| 2004/0047464 A1 | 3/2004 | Yu et al. |
| 2004/0057574 A1 | 3/2004 | Faller |
| 2004/0078199 A1 | 4/2004 | Kremer et al. |
| 2004/0131178 A1 | 7/2004 | Shahaf et al. |
| 2004/0133421 A1 | 7/2004 | Burnett et al. |
| 2004/0165736 A1 | 8/2004 | Hetherington et al. |
| 2004/0196989 A1 | 10/2004 | Friedman et al. |
| 2004/0263636 A1 | 12/2004 | Cutler et al. |
| 2005/0025263 A1 | 2/2005 | Wu |
| 2005/0027520 A1 | 2/2005 | Mattila et al. |
| 2005/0049864 A1 | 3/2005 | Kaltenmeier et al. |
| 2005/0060142 A1 | 3/2005 | Visser et al. |
| 2005/0152559 A1 | 7/2005 | Gierl et al. |
| 2005/0185813 A1 | 8/2005 | Sinclair et al. |
| 2005/0213778 A1 | 9/2005 | Buck et al. |
| 2005/0216259 A1 | 9/2005 | Watts |
| 2005/0228518 A1 | 10/2005 | Watts |
| 2005/0276423 A1 | 12/2005 | Aubauer et al. |
| 2005/0288923 A1 | 12/2005 | Kok |
| 2006/0072768 A1 | 4/2006 | Schwartz et al. |
| 2006/0074646 A1 | 4/2006 | Alves et al. |
| 2006/0098809 A1 | 5/2006 | Nongpiur et al. |
| 2006/0120537 A1 | 6/2006 | Burnett et al. |
| 2006/0133621 A1 | 6/2006 | Chen et al. |
| 2006/0149535 A1 | 7/2006 | Choi et al. |
| 2006/0160581 A1 | 7/2006 | Beaugeant et al. |
| 2006/0184363 A1 | 8/2006 | McCree et al. |
| 2006/0198542 A1 | 9/2006 | Benjelloun Touimi et al. |
| 2006/0222184 A1 | 10/2006 | Buck et al. |
| 2007/0021958 A1 | 1/2007 | Visser et al. |
| 2007/0027685 A1 | 2/2007 | Arakawa et al. |
| 2007/0033020 A1 | 2/2007 | (Kelleher) Francois et al. |
| 2007/0067166 A1 | 3/2007 | Pan et al. |
| 2007/0078649 A1 | 4/2007 | Hetherington et al. |
| 2007/0094031 A1 | 4/2007 | Chen |
| 2007/0100612 A1 | 5/2007 | Ekstrand et al. |
| 2007/0116300 A1 | 5/2007 | Chen |
| 2007/0150268 A1 | 6/2007 | Acero et al. |
| 2007/0154031 A1 | 7/2007 | Avendano et al. |
| 2007/0165879 A1 | 7/2007 | Deng et al. |
| 2007/0195968 A1 | 8/2007 | Jaber |
| 2007/0230712 A1 | 10/2007 | Belt et al. |
| 2007/0276656 A1 | 11/2007 | Solbach et al. |
| 2008/0019548 A1 | 1/2008 | Avendano |
| 2008/0033723 A1 | 2/2008 | Jang et al. |
| 2008/0140391 A1 | 6/2008 | Yen et al. |
| 2008/0201138 A1 | 8/2008 | Visser et al. |
| 2008/0228478 A1 | 9/2008 | Hetherington et al. |
| 2008/0260175 A1 | 10/2008 | Elko |
| 2009/0012783 A1 | 1/2009 | Klein |
| 2009/0012786 A1 | 1/2009 | Zhang et al. |
| 2009/0129610 A1 | 5/2009 | Kim et al. |
| 2009/0220107 A1 | 9/2009 | Every et al. |
| 2009/0238373 A1 | 9/2009 | Klein |
| 2009/0253418 A1 | 10/2009 | Makinen |
| 2009/0271187 A1 | 10/2009 | Yen et al. |
| 2009/0323982 A1 | 12/2009 | Solbach et al. |
| 2010/0094643 A1 | 4/2010 | Avendano et al. |
| 2010/0278352 A1 | 11/2010 | Petit et al. |
| 2011/0178800 A1 | 7/2011 | Watts |
| 2012/0121096 A1 | 5/2012 | Chen et al. |
| 2012/0140917 A1 | 6/2012 | Nicholson et al. |

FOREIGN PATENT DOCUMENTS

| | | |
|---|---|---|
| JP | 62110349 | 5/1987 |
| JP | 4184400 | 7/1992 |
| JP | 5053587 | 3/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004010415 | 1/2004 |
| WO | 2007/081916 | 7/2007 |
| WO | 2007/140003 | 12/2007 |
| WO | 2010/005493 | 1/2010 |

OTHER PUBLICATIONS

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.
Jeffress, Lloyd A. et al. "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.
International Search Report dated May 29, 2003 in Application No. PCT/US03/04124.
International Search Report and Written Opinion dated Oct. 19, 2007 in Application No. PCT/US07/00463.
International Search Report and Written Opinion dated Apr. 9, 2008 in Application No. PCT/US07/21654.
International Search Report and Written Opinion dated Sep. 16, 2008 in Application No. PCT/US07/12628.
International Search Report and Written Opinion dated Oct. 1, 2008 in Application No. PCT/US08/08249.
International Search Report and Written Opinion dated May 11, 2009 in Application No. PCT/US09/01667.
International Search Report and Written Opinion dated Aug. 27, 2009 in Application No. PCT/US09/03813.
International Search Report and Written Opinion dated May 20, 2010 in Application No. PCT/US09/06754.
Fast Cochlea Transform, US Trademark Reg. No. 2,875,755 (Aug. 17, 2004).
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.

* cited by examiner

SYSTEM AND METHOD FOR 2-CHANNEL AND 3-CHANNEL ACOUSTIC ECHO CANCELLATION

CROSS-REFERENCE TO RELATED APPLICATION

The present application claims the benefit of U.S. Provisional Patent Application No. 60/903,066, filed Feb. 23, 2007, entitled "Null Processing for AEC" and U.S. Provisional Patent Application No. 60/962,198, filed Jul. 26, 2007, entitled "2-Channel and 3-Channel Acoustic Echo Cancellation," both of which are hereby incorporated by reference.

The present application is also related to U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," U.S. patent application Ser. No. 11/699,732 filed Jan. 29, 2007 and entitled "System And Method For Utilizing Omni-Directional Microphones For Speech Enhancement," co-pending U.S. patent application Ser. No. 12/004,896 filed Dec. 21, 2007, entitled "System and Method for Blind Subband Acoustic Echo Cancellation Postfiltering," and co-pending U.S. patent application Ser. No. 12/004,788 filed Dec. 21, 2007, entitled "System and Method for Providing Voice Equalization," all of which are herein incorporated by reference.

BACKGROUND OF THE INVENTION

1. Field of Invention

The present invention relates generally to audio processing and more particularly to acoustic echo cancellation in an audio system.

2. Description of Related Art

Conventionally, when audio from a far-end environment is presented through a loudspeaker of a communication device, the audio may be picked up by microphones or other audio sensors of the communication device. As such, the far-end audio may be sent back to the far-end resulting in an echo to a far-end listener. In order to reduce or eliminate this echo, an acoustic echo canceller may be utilized.

In traditional acoustic echo cancellers, knowledge of the far-end signal (e.g., strength and magnitude of the far-end signal) is required in order to be able to cancel the far-end signal. These traditional acoustic echo cancellers typically utilize one microphone. With knowledge of the far-end signal, a derivation of the transmission path from the loudspeaker to the microphone is performed. Then, the result of the derivation path may be inverted or a pattern of the derivation modeled and applied to the far-end signal.

Some convention acoustic echo cancellation systems utilize two microphones. One of the key disadvantages with conventional acoustic echo cancellers is that in order to implement an adaptive filter between a client and each of the two microphones, two acoustic echo cancellers are needed.

SUMMARY OF THE INVENTION

Various embodiments of the present invention overcome or substantially alleviate prior problems associated with acoustic echo cancellation. Instead of cancelling between a loudspeaker and each of two microphones, a prediction between the two microphones is performed and a noise suppressor placed between the two microphones. Additionally, embodiments of the present invention do not require knowledge of a far-end signal being played through a loudspeaker (e.g., strength and magnitude), only a direction that the far-end signal is coming from. Because the loudspeaker is typically in a fixed location relative to the two microphones, this direction is known and a communication device may be appropriately calibrated prior to actual operation.

In exemplary embodiments, primary and secondary acoustic signal are received by a primary and secondary microphone of the communication device. Because a loudspeaker may provide audio that may be picked up by the primary and secondary microphone, the acoustic signals may include loudspeaker leakage. A null coefficient is then adaptively determined for each subband. At least one adaptation constraint may be applied by a null module to determine the null coefficient. The adaptation constraint may comprise a frequency range constraint or a far-end signal energy constraint, for example. The null coefficient is applied to the secondary acoustic signal to generate a coefficient-modified signal.

The coefficient-modified signal may be subtracted from the primary acoustic signal. In some embodiments, a masked acoustic signal may be generated based, at least in part, on the modified primary signal, by an adder or masking module. The masked acoustic signal may comprise reduced or no echo. In some embodiments, the masked acoustic signal may also comprise noise suppression masking. The masked acoustic signal may then be output.

DESCRIPTION OF EXEMPLARY EMBODIMENTS

The present invention provides exemplary systems and methods for acoustic echo cancellation (AEC). Various embodiments place a null in a direction of the loudspeaker, thus canceling a signal received from the loudspeaker. The direction of the null may be generated by a plurality of microphones prior to transmission of a signal back to a far-end. Embodiments of the present invention may be applied to both 2-channel and 3-channel AEC systems. In the 2-channel embodiment, the system utilizes a two-microphone system. In the 3-channel embodiment, the system utilizes the 2-channel AEC system and also has knowledge of an additional channel associated with a loudspeaker signal.

Exemplary embodiments are configured to prevent the loudspeaker signal from leaking through the two microphones to the far-end in a way that the far-end does not perceive an echo. These embodiments can perform AEC without having access to far-end signal information. In further embodiments, optimal near-end speech preservation may be achieved if the far-end signal is utilized. While the following description will focus on a two microphone system, alternative embodiments may utilize any number of microphones in a microphone array.

As such, various embodiments of the present invention do not require knowledge of a far-end signal being played through a loudspeaker (e.g., strength and magnitude), only a direction of the far-end signal. Because the loudspeaker is typically in a fixed location relative to the two microphones, this general range of direction from the loudspeaker and the region of speech may be easily determined. As a result, in some embodiments, a communication device may be calibrated prior to practical operation In one example, this general range of direction from the loudspeaker may be considered a blackout region where the null should not be placed.

Embodiments of the present invention may be practiced on any device that is configured to receive audio such as, but not limited to, cellular phones, phone handsets, headsets, and conferencing systems. While some embodiments of the present invention will be described in reference to operation on a speakerphone, the present invention may be practiced on any audio device.

Figure 1:
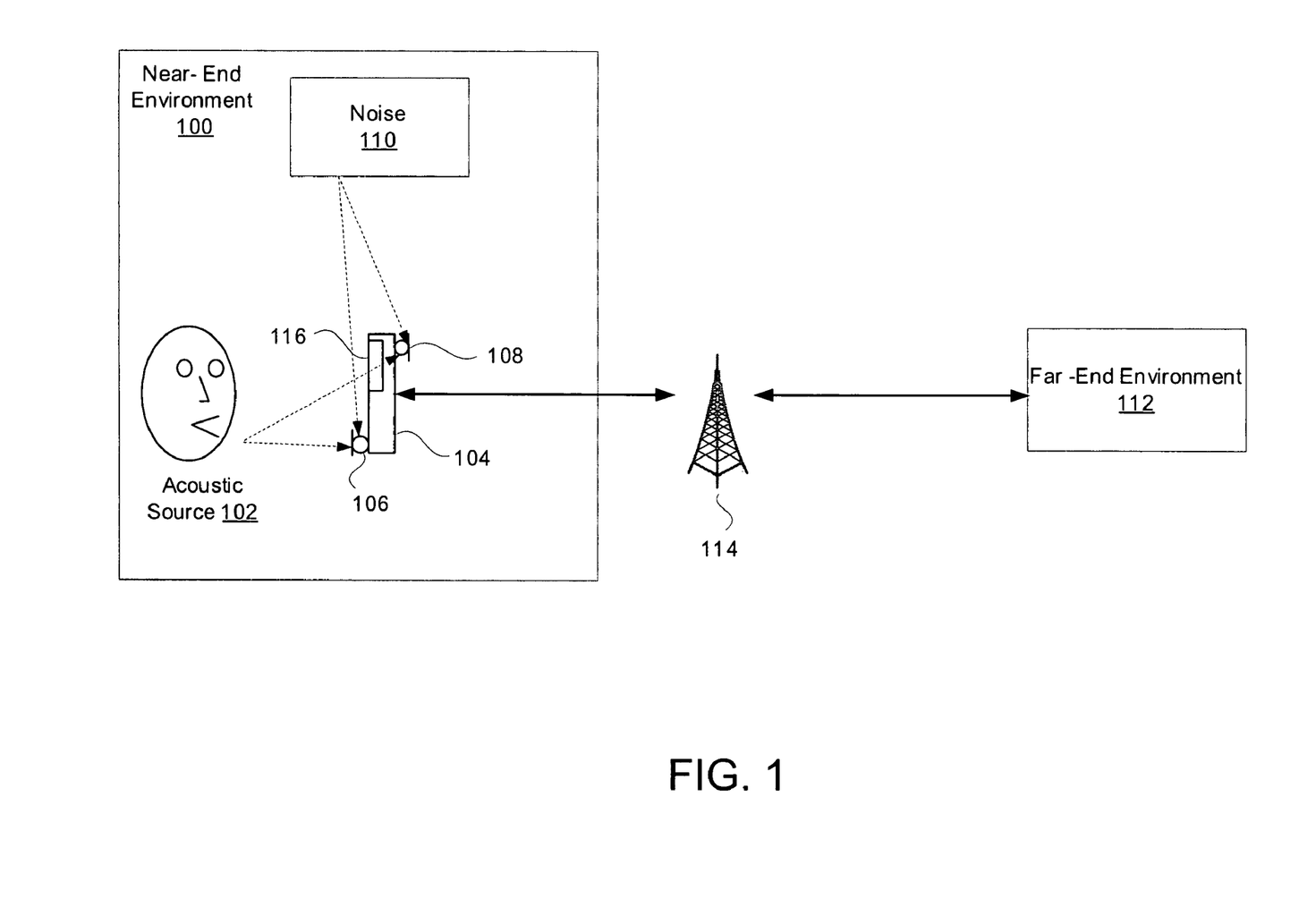
FIG. 1 is an environment in which embodiments of the present invention may be practiced.

Referring to FIG. 1, an environment in which embodiments of the present invention may be practiced is shown. A user in a near-end environment 100 acts as an acoustic source 102 to a communication device 104. The exemplary communication device 104 comprises two microphones: a primary microphone 106 relative to the acoustic source 102 and a secondary microphone 108 located a distance away from the primary microphone 106. In some embodiments, the primary and secondary microphones 106 and 108 comprise omni-directional microphones. It should also be noted that some embodiments of the present invention may be applied in both wideband and narrowband applications so long as a distance between the primary and secondary microphones 106 and 108 is not larger than a speed of sound divided by a sample rate.

While the microphones 106 and 108 receive sound (i.e., acoustic signals) from the acoustic source 102, the microphones 106 and 108 also pick up noise 110 in the near-end environment 100. Although the noise 110 is shown coming from a single location in FIG. 1, the noise 110 may comprise any sounds from one or more locations different than the acoustic source 102, and may include reverberations, echoes, and distractors. The noise 110 may be stationary, non-stationary, and/or a combination of both stationary and non-stationary noise.

Some embodiments of the present invention utilize level differences (e.g., energy differences) between the acoustic signals received by the two microphones 106 and 108. Because the primary microphone 106 is closer to the acoustic source 102 than the secondary microphone 108, the intensity level may be higher for the primary microphone 106 resulting in a larger energy level during a speech/voice segment, for example.

The level difference may then be used to discriminate speech and noise in the time-frequency domain. Further embodiments may use a combination of energy level differences and time delays to discriminate speech. Based on binaural cue decoding, speech signal extraction or speech enhancement may be performed.

An acoustic signal (e.g., comprising speech) from a far-end environment 112 may be received via a communication network 114 by the communication device 104. The received acoustic signal may then be provided to the near-end environment 100 via a loudspeaker 116 associated with the communication device 104. To attenuate or otherwise reduce leakage of a signal from the loudspeaker 116 into the microphones 106 and 108, a directivity pattern may be generated to emphasize signals received by the microphones 106 and 108 from the acoustic source 102 and generate a null in the direction of the loudspeaker 116.

Figure 2:
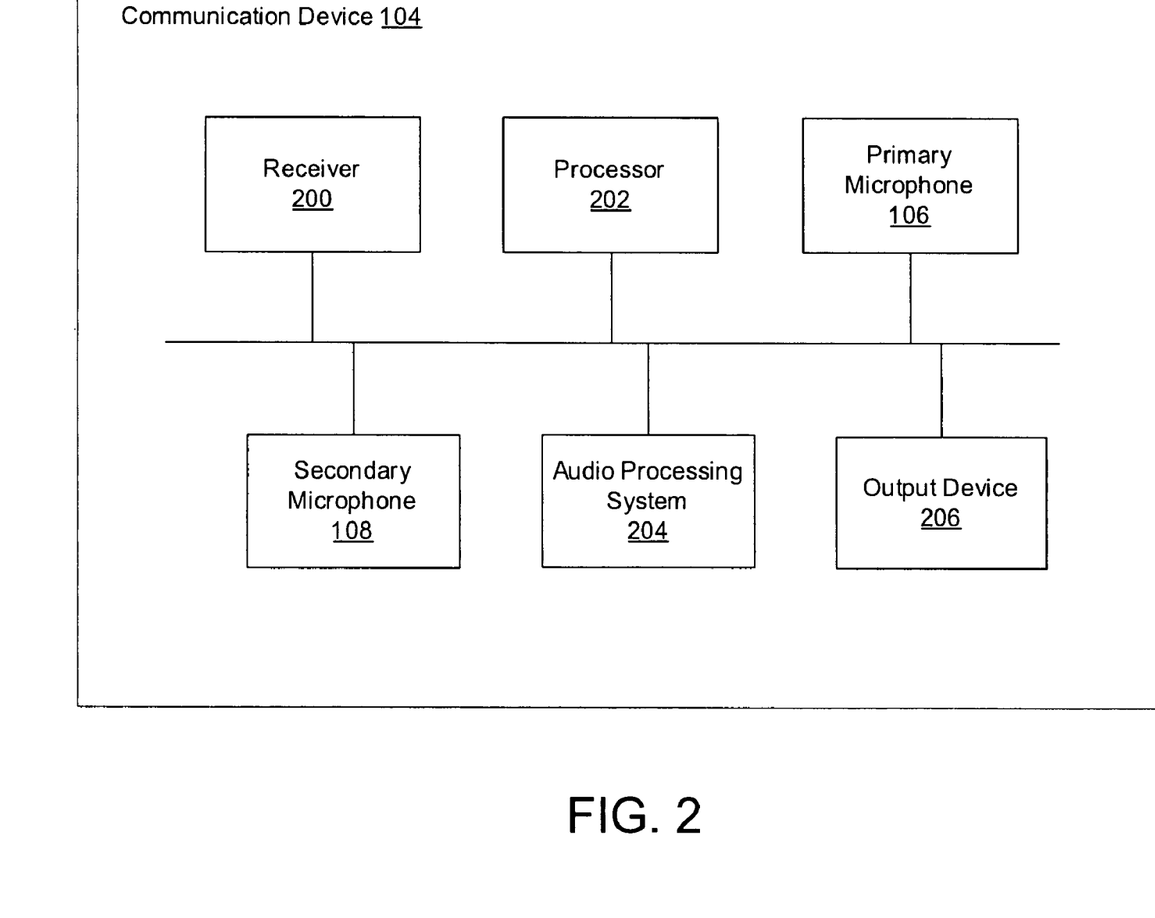
FIG. 2 is a block diagram of an exemplary communication device implementing embodiments of the present invention.

Referring now to FIG. 2, the exemplary communication device 104 is shown in more detail. In exemplary embodiments, the communication device 104 is an audio receiving device that comprises a receiver 200, a processor 202, the primary microphone 106, the secondary microphone 108, an audio processing system 204, and an output device 206. The communication device 104 may comprise further components necessary for communication device 104 operations.

The exemplary receiver 200 is an acoustic sensor configured to receive a far-end signal from the network 114. In some embodiments, the receiver 200 may comprise an antenna device. The received far-end signal may then be forwarded to the audio processing system 204.

The audio processing system 204 is configured to receive the acoustic signals from the primary and secondary microphones 106 and 108 (e.g., primary and secondary acoustic sensors) and process the acoustic signals. As previously discussed, the primary and secondary microphones 106 and 108, respectively, are spaced a distance apart in order to allow for an energy level differences and phase differences between them. After reception by the microphones 106 and 108, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal. It should be noted that embodiments of the present invention may be practiced utilizing a plurality of microphones.

The audio processing system 204 may also be configured to receive the far-end signal from the network 114 and provide the far-end signal to the output device 206 discussed below. In various embodiments, the audio processing engine 204 may attenuate noise within the far-end signal and/or emphasize speech prior to providing the processed far-end signal to the output 206.

The output device 206 is any device which provides an audio output to a listener (e.g., the acoustic source 102). For example, the output device 206 may comprise the loudspeaker 116, an earpiece of a headset, or handset on the communication device 104, for example.

Figure 3:
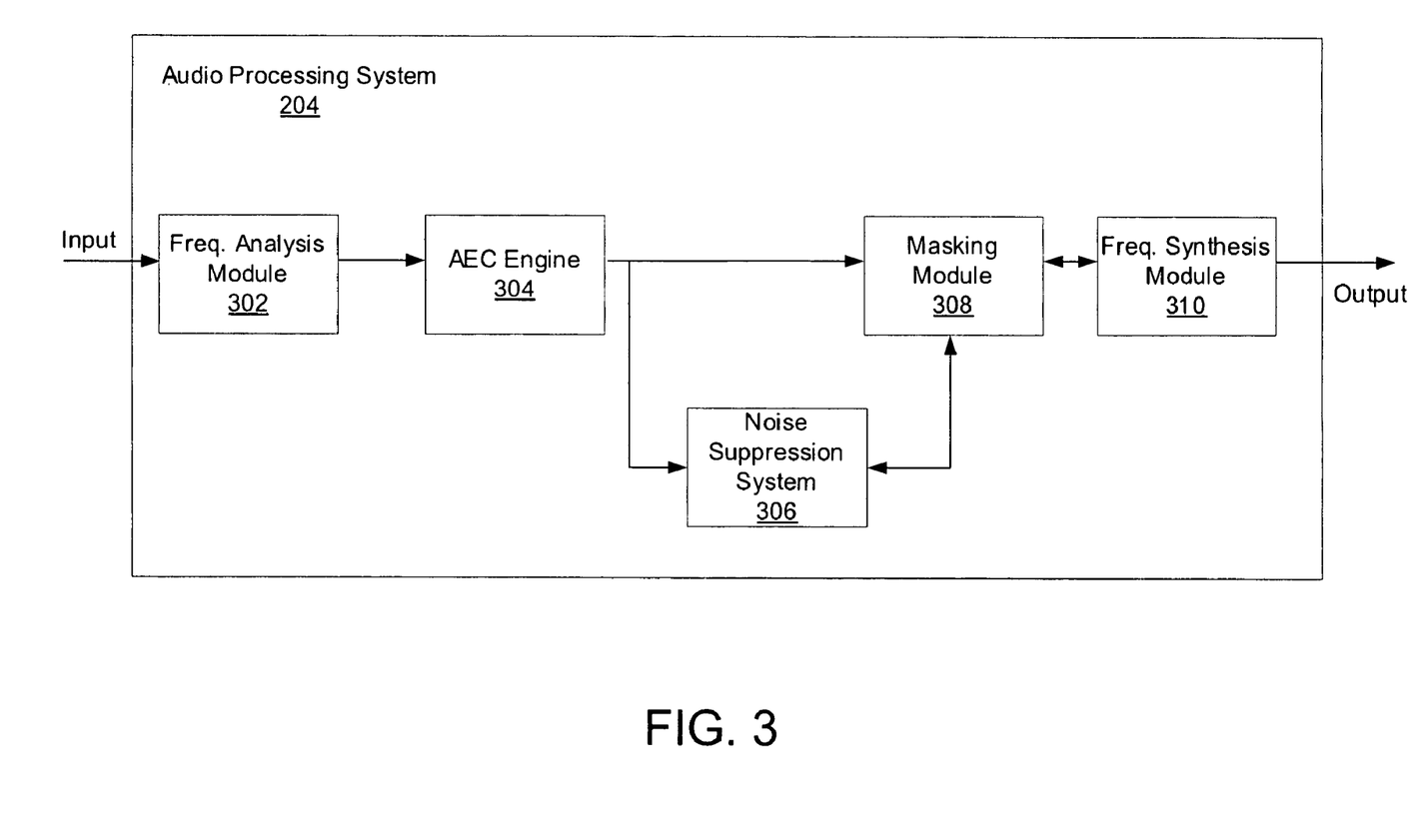
FIG. 3 is a block diagram of an exemplary audio processing system.

FIG. 3 is a detailed block diagram of the exemplary audio processing system 204, according to one embodiment of the present invention. In exemplary embodiments, the audio processing system 204 is embodied within a memory device. The exemplary audio processing system 204 may provide an acoustic echo cancellation (AEC) engine 304 within a noise suppression system. As a result, an acoustic signal sent from the communication device 104 may comprise reduced or eliminated echo from loudspeaker leakage. The acoustic signal may further comprise, in various embodiments, noise suppression. Those skilled in the art will appreciate that embodiments of the present invention are not limited to systems with a noise suppression.

In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency bands. Alternatively, other filters such as short-time Fourier transform (STFT), Fast Fourier Transform, Fast Cochlea transform, sub-band filter banks, modulated complex lapped transforms, cochlear models, a gamma-tone filter bank, wavelets, or any generalized spectral analysis filter/method, can be used for the frequency analysis and synthesis. Because most sounds (e.g., acoustic signals) are complex and comprise more than one frequency, a sub-band analysis on the acoustic signal may be performed to determine what individual frequencies are present in the acoustic signal during a frame (e.g., a predetermined period of time). According to one embodiment, the frame is 5-10 ms long. Alternative embodiments may utilize other frame lengths.

After frequency analysis, the signals are provided to an acoustic echo cancellation (AEC) engine 304. The AEC engine 304 is configured to reduce echo resulting from loudspeaker leakage through the primary and secondary microphones 106 and 108. The AEC engine 304 is discussed in more detail in connection with FIG. 4 below.

The results of the AEC engine 304 may be provided to a noise suppression system 306 which incorporates AEC engine 304 results with noise suppression. More details on exemplary noise suppression systems 306 may be found in co-pending U.S. patent application Ser. No. 11/825,563 filed Jul. 6, 2007 and entitled "System and Method for Adaptive Intelligent Noise Suppression," U.S. patent application Ser. No. 11/343,524, filed Jan. 30, 2006 and entitled "System and Method for Utilizing Inter-Microphone Level Differences for Speech Enhancement," and U.S. patent application Ser. No. 11/699,732 filed Jan. 29, 2007 and entitled "System And Method For Utilizing Omni-Directional Microphones For Speech Enhancement," all of which are incorporated by reference.

In some embodiments, the results of the AEC engine 304 (i.e., AEC masked signal) may comprise residual echo. As such, exemplary embodiments utilize a blind subband AEC postfilter (BSAP) system (not depicted) to render the residual echo inaudible.

The results of the AEC engine 304, the noise suppression system 306, and optionally, the BSAP system, may then be combined in a masking module 308. Accordingly in exemplary embodiments, gain masks may be applied to an associated frequency band of the primary acoustic signal in the masking module 308.

Next, the post-AEC frequency bands are converted back into time domain from the cochlea domain. The conversion may comprise taking the post-AEC frequency bands and adding together phase shifted signals of the cochlea channels in a frequency synthesis module 310. Once conversion is completed, the synthesized acoustic signal may be output (e.g., forwarded to the communication network 114 and sent to the far-end environment 112).

It should be noted that the system architecture of the audio processing system 204 of FIG. 3 is exemplary. Alternative embodiments may comprise more components, fewer components, or equivalent components and still be within the scope of embodiments of the present invention.

Figure 4:
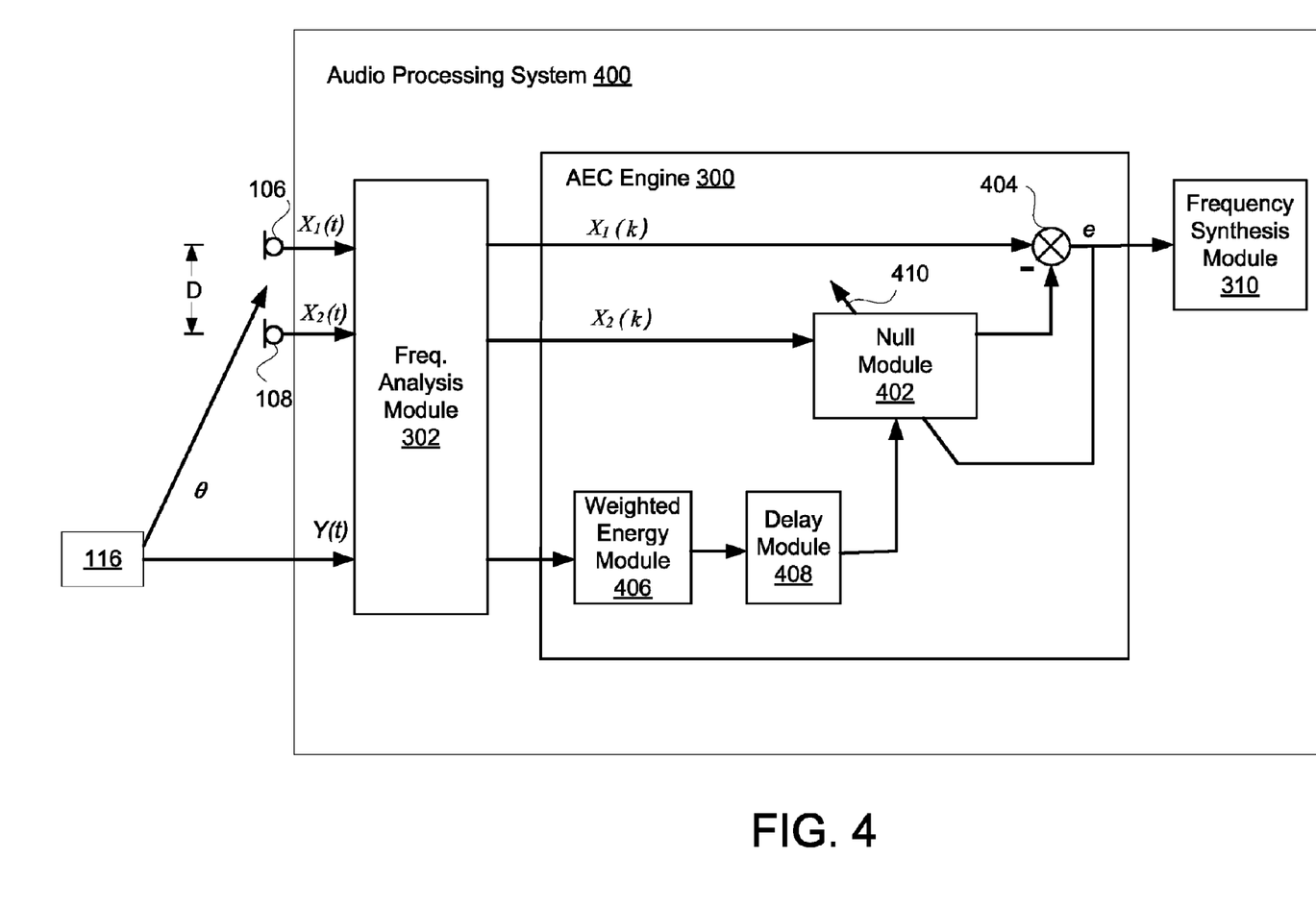
FIG. 4 is a block diagram of an exemplary acoustic echo cancellation engine in operation.

Referring now to FIG. 4, exemplary AEC engine 300 is shown in operation in the audio processing system 400. In operation, the acoustic signals (including audio from the loudspeaker 116) received from the primary and secondary microphones 106 and 108 (i.e., $X_1(t)$ and $X_2(t)$, respectively) are converted to electric signals and processed through the frequency analysis module 302 to obtain a primary (microphone channel) acoustic signal and a secondary (microphone channel) acoustic signal.

The exemplary AEC engine 300 is configured to use a subband differential array to create a null in an effective direction of the loudspeaker signal with respect to the primary and secondary microphone 106 and 108. In exemplary embodiments, a null module 402 determines and applies a time-varying complex coefficient (i.e., null coefficient) to the secondary microphone channel acoustic signal to generate a coefficient-modified acoustic signal. In exemplary embodiments the complex coefficient may be continuously adapted to minimize residual echo. The result of the null module 402 is then sent to an adder 404 which subtracts the coefficient-modified acoustic signal from the primary microphone channel acoustic signal.

A model for narrow-spaced microphone cross transfer function of exemplary embodiments is that of a fractional shift in time (e.g., positive or negative) with attenuation. This may be justified by physics of sound propagation if a microphone spacing, D, (i.e., between the primary and secondary microphone 106 and 108) obeys an equation $D<c/f_s$, where c is a speed of sound and $f_s$ is a sample rate. Those skilled in the art will appreciate that it is not required for the delay of the model for narrow-spaced microphone cross transfer function to be fractional without an integer part.

Both a gain and a phase of a cross-microphone transfer function may be dependent on a signal frequency and an angle of arrival theta, $\theta$, as follows:

$$H_C(f, \theta) = \frac{1}{a(f, \theta) \cdot e^{i \cdot 2\pi f \cdot d(\theta)}}.$$

For a given frequency subband with index n, the transfer function may be approximated based on a magnitude and phase at a subband center frequency as follows:

$$H_n(\theta) = \frac{1}{a_n(\theta) \cdot e^{i\varphi_n(\theta)}}.$$

In various embodiments, the higher-order approximations to the fractional delay may be used as well. The above equation relates the primary acoustic signal with angle of arrival theta in the primary microphone 106 to the secondary acoustic signal in the secondary microphone 108 in the frequency subband with index n as follows:

$$X_{2,n}(\theta) = \frac{X_{1,n}(\theta)}{a_n(\theta) \cdot e^{i\varphi_n(\theta)}}.$$

In order to subtractively cancel the primary acoustic signal with angle of arrival theta, the secondary acoustic signal multiplied by an inverse cross-transfer function may be subtracted as mathematically described by:

$$X_{1,n}(\theta) - X_{2,n}(\theta) \cdot a_n(\theta) \cdot e^{i\varphi_n(\theta)} = 0.$$

In embodiments where a pure sinusoid at the subband's center frequency, the cancellation may approximate the entire signal picked up by the microphones 106 and 108 from the loudspeaker 116. The same may hold true for all signals if the angle of arrival theta is equal to 0 or 180 degrees since a fractional shift at these angles is zero.

As an inverse of an approximate inter-channel cross-transfer function in each subband is a single complex multiplier, it may be computed using zero-lag correlations as follows:

$$H_n^{-1}(\delta) = \frac{E\{x_2^*(k) \cdot x_1(k)\}}{E\{x_2^*(k) \cdot x_2(k)\}}. \qquad \text{Equ. (1)}$$

In exemplary embodiments, the null module 402 may perform null coefficient adaptation. A frame-based recursive approximation may be used, where m is a running frame and N is a frame length as follows:

$$H_n^{-1}(m) = H_n^{-1}(m-1) + \mu \cdot \frac{\sum_k^N x_2^*(k) \cdot x_1(k)}{\alpha + \sum_k^N x_2^*(k) \cdot x_2(k)}.$$

The result of this computation is an estimate of the time-varying inverse of the cross-transfer function between the primary and secondary microphone 106 and 108. This estimate may then be multiplied with frame samples of the secondary microphone 108 in the null module 402. The result may then be subtracted from the frame samples of the primary microphone 106 in the adder 404 resulting in the following exemplary equations:

$$y(k) = x_1(k) - x_2(k) \cdot H_n^{-1}(m).$$

In order to prevent cancellation of a near-end speech signal from the acoustic source 102, various adaptation constraints may be applied by the null module 402. That is, the null module 402 attempts to constrain the null coefficient such that the null coefficient cancels the echo with little or no effect on the near-end speech.

One such constraint comprises a frequency range constraint. Loudspeakers associated with conventional mobile handsets may comprise limited capabilities for transmitting low frequency content. For example, in a speakerphone mode, a low corner frequency may be 600 Hz. As such, an echo cancellation may be constrained to a range of subbands covering a frequency range of the loudspeaker. Any subbands outside of the speaker frequency are not subject to echo cancellation.

Some embodiments of the present inventions apply AEC based on subbands rather than globally. This allows the system to preserve the ability to adapt in regions of the spectrum where a far-end signal is faint with respect to the near-end signal, and vice-versa. As a result, calibration may be performed prior to implementation in the communication device 104. Calibration may comprise playing pink noise in a sound room through an industrial design loudspeaker. A resulting primary acoustic signal is then fed through a frequency analysis module. Average subband frame energies may then be stored in a communication device configuration file (e.g., stored in the null module 402).

In various embodiments, the AEC is not applied when there is no far-end signal present. In one example, the far-end is never entirely quiet because of quantization noise in the encoding process and comfort noise being inserted by typical codes during times of silence. Further, what may qualify as "no signal" at one volume setting may not be negligible in another. The application of the AEC based on subbands may avoid global errors that attenuate desired speech or emphasize noise.

Once the device is in operation, the null module 402 may determine whether the observed predictor between the two microphones is in a near-end acoustic source class or a loudspeaker class. During calibration, an estimate of the leakage from the loudspeaker to the two microphones may be determined. In one example, calibration may occur offline prior to practical use of the communication device. In another example, calibration may occur online (e.g., the coefficients may be learned online). While the device is in operation, a leakage curve may be utilized by the null module 402. Based on an applied energy, an expected leakage in the two microphones may be determined. If the signal observe in the secondary microphone 108 is above the curve, then an assumption may be made that the signal is mainly from the acoustic source 102.

For example, if a primary microphone energy exceeds the average subband frame energy level, the primary microphone energy is higher than expected given a current far-end energy. In exemplary embodiments, this signifies that most of the signal in the given subband is not due to echo. So an adaptation rule for this predictor between the two microphones is based on location. If the signal is in the loudspeaker class, AEC may occur in order to cancel echo. If the signal is in the near-end acoustic source class, AEC may not occur. There may also be a variant where the coefficient is frozen and a variant where the coefficients may fade—essentially placing a magnitude to zero.

In order to compensate for delay in an echo path, the far-end energy signal (from Weighted Energy Module 406 in FIG. 4) may be delayed by a delay module 408. In one embodiment, the delay may be a same amount before comparing a threshold derived from the far-end energy with a current primary microphone energy. This delay may be obtained from calibration and may comprise both an acoustic path delay and a delay incurred from framing in a A/D and D/A conversion.

In order to prevent cancellation of a near-end speaker, another calibration method may be performed. In this calibration method, null-coefficients may be computed for $N_e$ echo paths from playing pink noise through the loudspeaker and computing equation (1) for each null coefficient. This may also be performed for a total of five head and torso simulators (HATS) pink noise recordings (e.g., one for nominal near-end loudspeaker position and four for angles +/−30 degrees up and down from the nominal position. The result is $5+N_e$, where $N_e$ of the coefficients are in an echo class and five are in a near-end class.

As a difference metric between two null-coefficients, the following equation may be used:

$$d = |\log(a_1) - \log(a_2)|$$

An observation may then be assigned to one of the two classes (i.e., echo class or near-end class). In exemplary embodiments, adaptation in a particular frequency subband may be allowed if a current null coefficient update is closer to the echo class than it is to the near-end class as determined by the AEC engine 300.

In some embodiments, various adaptation criteria may be satisfied in order for the AEC engine 300 to allow a particular subband to update related coefficients. For example, where one or more adaptation criteria are not satisfied, the current coefficient angle may be frozen and its magnitude may be subject to an exponential decay This may minimize signal alterations during single talk in the near-end environment 100. In other embodiments, both the current coefficient angle and the magnitude may be frozen.

Once the coefficient-modified acoustic signal is subtracted from the primary acoustic signal, the resulting signal is forwarded to the frequency synthesis module 310. In various embodiments, the resulting signal is forwarded to the masking module 308 prior to resynthesis. The frequency synthesis module 310 converts the resulting signal back into time domain from the cochlea domain. Once conversion is complete, the synthesized acoustic signal may be output.

In some embodiments, a switch 410 may be provided. Thus, if AEC is being performed, then the resulting signal may be fed back into the null module 402. If AEC is not being performed, the switch 410 may be closed.

It should be noted that the system architecture of the audio processing system 400 of FIG. 4 is exemplary. Alternative embodiments may comprise more components, less components, or equivalent components and still be within the scope of embodiments of the present invention.

Figure 5:
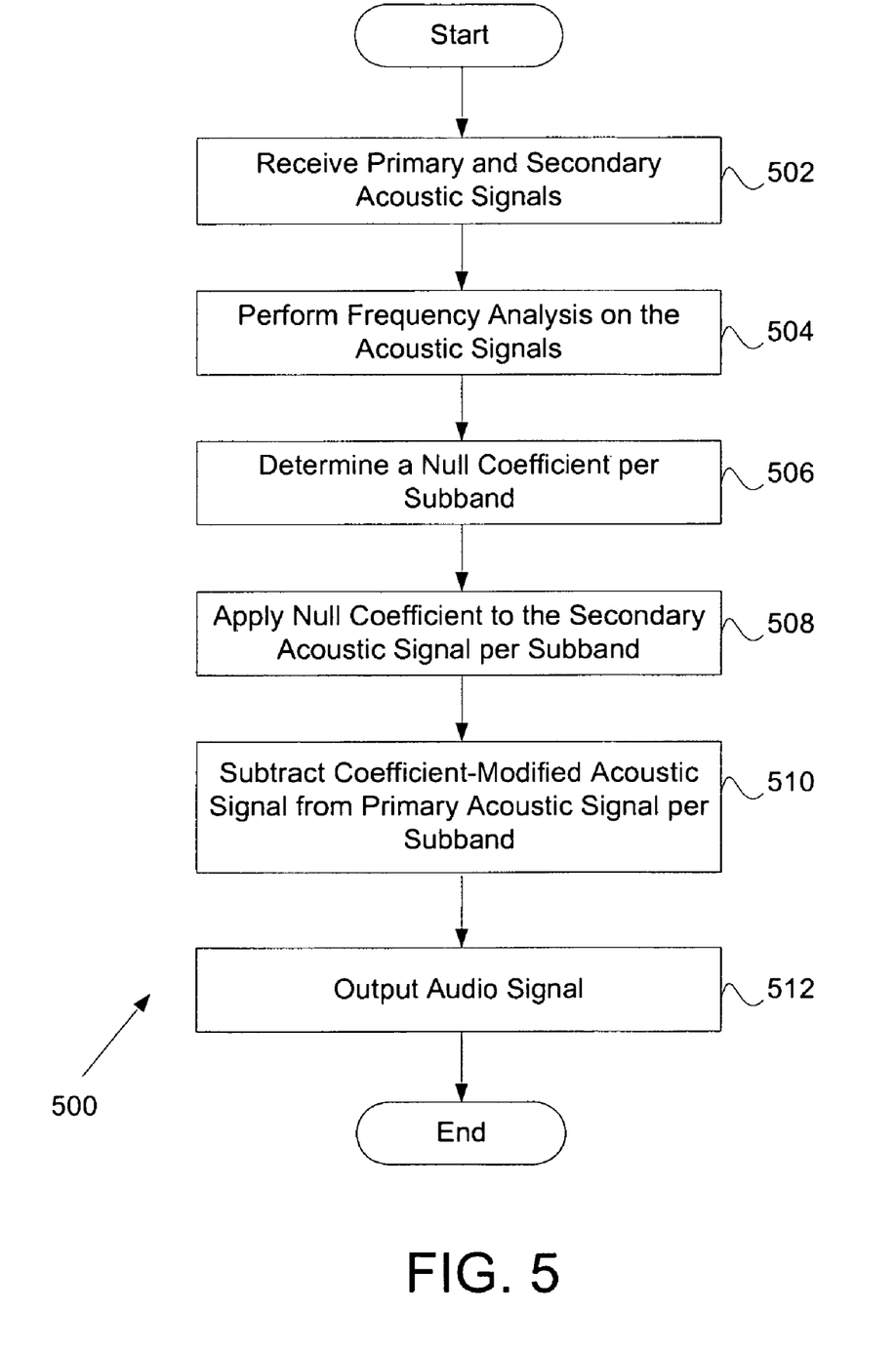
FIG. 5 is a flowchart of an exemplary method for acoustic echo cancellation.

Referring now to FIG. 5, a flowchart 500 of an exemplary method for providing acoustic echo cancellation (AEC) is provided. In step 502, the acoustic signals from a near-end environment 100 are received by the primary and secondary microphones 106 and 108. If audio from a far-end is being output through the loudspeaker 116, then audio from the loudspeaker may leak back to the primary and secondary microphones 106 and 108. This may result in an echo being provided back to a listener at the far-end environment 112.

The acoustic signals are then converted to electric signals and processed through the frequency analysis module 302 to obtain a primary (microphone channel) acoustic signal and a secondary (microphone channel) acoustic signal in step 504. In one embodiment, the frequency analysis module 302 takes the acoustic signals and mimics the frequency analysis of a cochlea (i.e., cochlear domain) simulated by a filter bank. The result comprises frequency subbands.

In step 506, a null coefficient per subband is determined. As discussed, the exemplary AEC engine 300 is configured to use a subband differential array to create a null in an effective direction of the loudspeaker signal with respect to the primary and secondary microphone 106 and 108. In exemplary embodiments, the null module 402 determines a time-varying complex coefficient (i.e., null coefficient). In some embodiments, this complex coefficient may be continuously adapted to minimize residual echo.

The null coefficient is then applied to the secondary acoustic signal per subband in step 508 to generate a coefficient-modified acoustic signal. The coefficient-modified acoustic signal is then sent to the adder 404 which subtracts the coefficient-modified acoustic signal from the primary acoustic signal per subband in step 510. In an embodiment comprising a noise suppression system, the masking module 308 may apply noise suppression masking to the primary acoustic signal with the result comprising masked frequency bands.

The masked frequency bands may then be output in step 512. In accordance with exemplary embodiments, the masked frequency bands are converted back into time domain from the cochlea domain. The conversion may comprise taking the masked frequency bands and adding together phase shifted signals of the cochlea channels in the frequency synthesis module 310. Once conversion is completed, the synthesized acoustic signal may be output (e.g., forwarded to the communication network 114 and sent to the far-end environment 112).

The above-described modules can be comprised of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, embodiments of the present invention may be applied to any system (e.g., non speech enhancement system) as long as a noise power spectrum estimate is available. Therefore, these and other variations upon the exemplary embodiments are intended to be covered by the present invention.

The invention claimed is:

1. A method for providing acoustic echo cancellation, comprising:
   receiving a primary and secondary acoustic signal at a communication device;
   adaptively determining a null coefficient for each subband of the secondary acoustic signal;
   applying the null coefficient for each subband of the secondary acoustic signal to a respective subband of the secondary acoustic signal to generate a coefficient-modified signal;
   subtracting the coefficient-modified signal from the primary acoustic signal to generate a masked acoustic signal; and
   outputting the masked acoustic signal.

2. The method of claim 1 further comprising converting the masked acoustic signal into time domain for outputting.

3. The method of claim 1 further comprising applying a noise suppression mask to the primary acoustic signal.

4. The method of claim 3 wherein adaptively determining the null coefficient is represented by $$H_n^{-1}(m) = H_n^{-1}(m-1) + \mu \cdot \frac{\sum_k^N x_2^*(k) \cdot x_1(k)}{\alpha + \sum_k^N x_2^*(k) \cdot x_2(k)},$$

where m is a running frame and N is a frame length.

5. The method of claim 1 wherein adaptively determining the null coefficient comprises applying at least one adaptation constraint.

6. The method of claim 5 wherein the at least one adaptation constraint comprises a frequency range constraint.

7. The method of claim 5 wherein the at least one adaptation constraint comprises a far-end signal energy constraint.

8. The method of claim 1 further comprising calibrating the communication device.

9. The method of claim 1 further comprising determining a far-end energy signal.

10. The method of claim 9 further comprising delaying the far-end energy signal.

11. The method of claim 1 further comprising providing a switch, the switch allowing selective implementation of the acoustic echo cancellation in a noise suppression system.

12. A system for providing acoustic echo cancellation in a communication device, comprising:
   an acoustic sensor configured to receive a primary acoustic signal and a secondary acoustic signal;

a null module configured to adaptively determine a null coefficient for each subband of the secondary acoustic signal and apply the null coefficient for each subband of the secondary acoustic signal to a respective subband of the secondary acoustic signal to generate a coefficient-modified signal; and an adder configured to subtract the coefficient-modified signal from the primary acoustic signal to generate a masked acoustic signal.

13. The system of claim 12 further comprising a frequency synthesis module configured to convert the masked acoustic signal into time domain for outputting.

14. The system of claim 12 further comprising a noise suppression system configured to reduce near-end noise from the primary acoustic signal.

15. The system of claim 12, wherein the null module configured to adaptively determine the null coefficient comprises the null module configured to adaptively determine the null coefficient represented by $$H_n^{-1}(m) = H_n^{-1}(m-1) + \mu \cdot \frac{\sum_{k}^{N} x_2^*(k) \cdot x_1(k)}{\alpha + \sum_{k}^{N} x_2^*(k) \cdot x_2(k)},$$

where m is a running frame and N is a frame length.

16. The system of claim 12 wherein the null module is further configured to calibrate the communication device.

17. The system of claim 12 further comprising a weighted energy module configured to determine a far-end energy signal.

18. The system of claim 17 further comprising a delay module configured to delay the far-end energy signal.

19. The system of claim 17 further comprising a switch configured to allow selective implementation of the acoustic echo cancellation in a noise suppression system.

20. A non-transitory machine readable medium having embodied thereon a program, the program providing instructions for a method for acoustic echo cancellation, the method comprising:

receiving a primary and secondary acoustic signal at a communication device;

adaptively determining a null coefficient for each subband of the secondary acoustic signal;

applying the null coefficient for each subband of the secondary acoustic signal to a respective subband of the secondary acoustic signal to generate a coefficient-modified signal;

subtracting the coefficient-modified signal from the primary acoustic signal to generate a masked acoustic signal; and outputting the masked acoustic signal.

* * * * *